(12) United States Patent
Newbrough

(10) Patent No.: US 7,885,878 B2
(45) Date of Patent: Feb. 8, 2011

(54) SYSTEMS AND METHODS OF PAYMENT ACCOUNT ACTIVATION

(75) Inventor: Keith A. Newbrough, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 72 days.

(21) Appl. No.: 12/128,229

(22) Filed: May 28, 2008

(65) Prior Publication Data

US 2009/0299864 A1    Dec. 3, 2009

(51) Int. Cl.
*G06Q 40/00* (2006.01)
(52) U.S. Cl. ............................. 705/35; 705/17; 705/65; 380/23; 380/24; 235/375; 235/379; 235/380
(58) Field of Classification Search .................... 705/35; 235/375; 380/23–24
See application file for complete search history.

(56) References Cited

U.S. PATENT DOCUMENTS

| | | |
|---|---|---|
| 4,106,062 A | 8/1978 | Foote |
| 4,528,643 A | 7/1985 | Freeny, Jr. |
| 4,700,055 A | 10/1987 | Kashkashian, Jr. |
| 4,804,827 A | 2/1989 | Jung |
| 4,829,168 A | 5/1989 | Nakahara |
| 4,855,583 A | 8/1989 | Fraser et al. |
| 4,884,212 A | 11/1989 | Stutsman |
| 5,074,593 A | 12/1991 | Grosso |
| 5,146,067 A | 9/1992 | Sloan et al. |
| 5,179,585 A | 1/1993 | MacMillan, Jr. et al. |
| 5,220,501 A | 6/1993 | Lawlor et al. |
| 5,255,182 A | 10/1993 | Adams |
| 5,352,876 A | 10/1994 | Watanabe et al. |
| 5,440,108 A | 8/1995 | Tran et al. |
| 5,471,669 A | 11/1995 | Lidman |
| 5,477,038 A | 12/1995 | Levine et al. |
| 5,504,808 A | 4/1996 | Hamrick, Jr. |
| 5,511,114 A | 4/1996 | Stimson |
| 5,513,117 A | 4/1996 | Small |
| 5,518,122 A | 5/1996 | Tilles et al. |
| 5,557,516 A | 9/1996 | Hogan |

(Continued)

FOREIGN PATENT DOCUMENTS

CA        2300241        3/2000

(Continued)

OTHER PUBLICATIONS

PCT International Search Report mailed Jan. 8, 2010; International Application No. PCT/US2009/045042; 4 pages.

(Continued)

*Primary Examiner*—Vanel Frenel
(74) *Attorney, Agent, or Firm*—Townsend and Townsend and Crew LLP

(57) ABSTRACT

Systems and methods are provided for activating a payment account. The payment account is associated with two identifiers. A payment instrument is provided as having the two identifiers. A first identifier is read at a first point of sale device to activate the payment account. A second identifier is read by a radio frequency identification reader at a second point of sale device to access funds in the payment account. The first point of sale device may not be capable of reading the second identifier.

17 Claims, 2 Drawing Sheets

U.S. PATENT DOCUMENTS

| | | |
|---|---|---|
| 5,585,787 A | 12/1996 | Wallerstein |
| 5,592,400 A | 1/1997 | Sasou |
| 5,609,253 A | 3/1997 | Goade, Sr. |
| 5,637,845 A | 6/1997 | Kolls |
| 5,678,010 A | 10/1997 | Pittenger et al. |
| 5,720,158 A | 2/1998 | Goade, Sr. |
| 5,721,768 A | 2/1998 | Stimson et al. |
| D396,882 S | 8/1998 | Neal, Jr. |
| 5,796,832 A | 8/1998 | Kawan |
| 5,863,076 A | 1/1999 | Warther |
| 5,868,236 A | 2/1999 | Rademacher |
| 5,903,633 A | 5/1999 | Lorsch |
| 5,913,203 A | 6/1999 | Wong et al. |
| 5,918,909 A | 7/1999 | Fiala et al. |
| 5,921,584 A | 7/1999 | Goade, Sr. |
| 5,936,221 A | 8/1999 | Corder et al. |
| 5,936,227 A | 8/1999 | Truggelmann et al. |
| 5,937,394 A | 8/1999 | Wong et al. |
| 5,955,961 A | 9/1999 | Wallerstein |
| 5,956,699 A | 9/1999 | Wong et al. |
| 5,983,003 A | 11/1999 | Lection et al. |
| 5,984,181 A | 11/1999 | Kreft |
| 5,987,438 A | 11/1999 | Nakano et al. |
| 5,991,413 A | 11/1999 | Arditti et al. |
| 5,991,748 A | 11/1999 | Taskett |
| 6,006,988 A | 12/1999 | Behrmann et al. |
| D429,733 S | 8/2000 | Jones et al. |
| 6,129,275 A | 10/2000 | Urquhart et al. |
| 6,145,665 A | 11/2000 | Krahn |
| D436,991 S | 1/2001 | Morgante |
| 6,169,975 B1 | 1/2001 | White et al. |
| 6,193,155 B1 | 2/2001 | Walker et al. |
| 6,196,594 B1 | 3/2001 | Keller |
| 6,224,108 B1 | 5/2001 | Klure |
| 6,248,199 B1 | 6/2001 | Smulson |
| 6,257,469 B1 | 7/2001 | Cohn |
| 6,295,522 B1 | 9/2001 | Boesch |
| 6,298,336 B1 | 10/2001 | Davis et al. |
| 6,299,530 B1 | 10/2001 | Hansted et al. |
| 6,353,420 B1 | 3/2002 | Chung |
| 6,356,196 B1 | 3/2002 | Wong et al. |
| 6,370,514 B1 | 4/2002 | Messner |
| D457,556 S | 5/2002 | Hochschild |
| 6,386,457 B1 | 5/2002 | Sorie |
| 6,405,182 B1 | 6/2002 | Cuervo |
| 6,471,127 B2 | 10/2002 | Pentz et al. |
| 6,473,500 B1 | 10/2002 | Risafi et al. |
| 6,484,940 B1 | 11/2002 | Dilday et al. |
| 6,510,983 B2 | 1/2003 | Horowitz et al. |
| 6,516,357 B1 | 2/2003 | Hamann et al. |
| 6,543,809 B1 | 4/2003 | Kistner et al. |
| 6,547,132 B1 | 4/2003 | Templeton et al. |
| 6,561,432 B1 | 5/2003 | Vedder et al. |
| 6,588,658 B1 | 7/2003 | Blank |
| 6,592,044 B1 | 7/2003 | Wong et al. |
| 6,607,127 B2 | 8/2003 | Wong |
| 6,609,654 B1 | 8/2003 | Anderson et al. |
| 6,644,555 B1 | 11/2003 | Berney |
| 6,685,097 B1 | 2/2004 | Housse |
| 6,688,529 B1 | 2/2004 | Goade, Sr. |
| 6,702,185 B1 | 3/2004 | Zercher |
| 6,708,820 B2 | 3/2004 | Hansen et al. |
| 6,727,802 B2 | 4/2004 | Kelly et al. |
| 6,745,022 B2 | 6/2004 | Knox |
| 6,753,341 B1 | 6/2004 | King |
| 6,760,280 B1 | 7/2004 | Schoppe |
| 6,761,319 B2 | 7/2004 | Peachman et al. |
| 6,805,288 B2 | 10/2004 | Routhenstein et al. |
| 6,811,082 B2 | 11/2004 | Wong |
| 6,814,286 B2 | 11/2004 | Cheung |
| 6,817,530 B2 | 11/2004 | Labrec et al. |
| 6,827,260 B2 | 12/2004 | Stoutenburg et al. |
| 6,827,264 B2 | 12/2004 | Morgavi |
| 6,829,596 B1 | 12/2004 | Frazee |
| 6,886,742 B2 | 5/2005 | Stoutenburg et al. |
| 6,912,398 B1 | 6/2005 | Domnitz |
| D512,456 S | 12/2005 | Diaz et al. |
| 7,000,844 B1 | 2/2006 | Smith |
| 7,032,817 B2 | 4/2006 | Blank |
| 7,054,842 B2 | 5/2006 | James et al. |
| 7,086,584 B2 | 8/2006 | Stoutenburg et al. |
| 7,097,108 B2 | 8/2006 | Zellner et al. |
| 7,104,439 B2 | 9/2006 | Dewan et al. |
| 7,106,201 B2 | 9/2006 | Tuttle |
| 7,234,637 B2 | 6/2007 | Berthe |
| 7,278,570 B2 | 10/2007 | McGee et al. |
| 7,309,007 B2 | 12/2007 | Kean |
| 7,324,641 B2 | 1/2008 | McGee et al. |
| 2001/0018660 A1 | 8/2001 | Sehr |
| 2001/0023409 A1 | 9/2001 | Keil |
| 2001/0023415 A1 | 9/2001 | Keil |
| 2001/0037316 A1 | 11/2001 | Shiloh |
| 2001/0047330 A1 | 11/2001 | Gephart et al. |
| 2001/0047342 A1 | 11/2001 | Cuervo |
| 2002/0006103 A1 | 1/2002 | Duroj |
| 2002/0007320 A1 | 1/2002 | Hogan et al. |
| 2002/0022966 A1 | 2/2002 | Horgan |
| 2002/0026412 A1 | 2/2002 | Kabin |
| 2002/0027837 A1 | 3/2002 | Weber |
| 2002/0049669 A1 | 4/2002 | Bleser et al. |
| 2002/0053595 A1 | 5/2002 | Tseng et al. |
| 2002/0066789 A1 | 6/2002 | Yen |
| 2002/0088851 A1 | 7/2002 | Hodes |
| 2002/0091573 A1 | 7/2002 | Hodes |
| 2002/0095387 A1 | 7/2002 | Sosa et al. |
| 2002/0096570 A1 | 7/2002 | Wong et al. |
| 2002/0099607 A1* | 7/2002 | Sosa et al. ................... 705/14 |
| 2002/0100797 A1 | 8/2002 | Hollingsworth et al. |
| 2002/0117243 A1 | 8/2002 | Koren |
| 2002/0133467 A1 | 9/2002 | Hobson et al. |
| 2002/0153414 A1 | 10/2002 | Stoutenburg et al. |
| 2002/0157974 A1 | 10/2002 | Krahn |
| 2002/0169719 A1 | 11/2002 | Dively et al. |
| 2002/0174016 A1 | 11/2002 | Cuervo |
| 2002/0185543 A1 | 12/2002 | Pentz et al. |
| 2003/0010829 A1 | 1/2003 | Krygier |
| 2003/0014371 A1 | 1/2003 | Turgeon |
| 2003/0053609 A1 | 3/2003 | Risafi et al. |
| 2003/0061168 A1 | 3/2003 | Routhenstein |
| 2003/0065624 A1 | 4/2003 | James et al. |
| 2003/0086705 A1 | 5/2003 | Silverbrook et al. |
| 2003/0145205 A1 | 7/2003 | Sarcanin |
| 2003/0150762 A1 | 8/2003 | Biller |
| 2003/0150919 A1 | 8/2003 | Blank |
| 2003/0233844 A1 | 12/2003 | Rheinstein |
| 2004/0040189 A1 | 3/2004 | Chandaria |
| 2004/0080784 A1 | 4/2004 | Fujimoto |
| 2004/0126284 A1 | 7/2004 | Lilly et al. |
| 2004/0129785 A1 | 7/2004 | Luu |
| 2004/0131760 A1 | 7/2004 | Shakespeare |
| 2004/0139004 A1 | 7/2004 | Cohen et al. |
| 2004/0139318 A1 | 7/2004 | Fiala et al. |
| 2004/0144846 A1 | 7/2004 | Lasch et al. |
| 2004/0158532 A1 | 8/2004 | Breck et al. |
| 2004/0169087 A1 | 9/2004 | Lasch et al. |
| 2004/0182940 A1 | 9/2004 | Biller |
| 2004/0210449 A1 | 10/2004 | Breck et al. |
| 2005/0075985 A1* | 4/2005 | Cartmell ................... 705/67 |
| 2005/0077349 A1 | 4/2005 | Bonalle et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0098624 A1* | 5/2005 | Foss ................... 235/380 |

| | | | |
|---|---|---|---|
| 2005/0104718 A1 | 5/2005 | Casto et al. | |
| 2005/0137986 A1 | 6/2005 | Kean et al. | |
| 2005/0173520 A1 | 8/2005 | Jaros et al. | |
| 2005/0177480 A1 | 8/2005 | Huang | |
| 2005/0180550 A1 | 8/2005 | McGee et al. | |
| 2005/0211760 A1 | 9/2005 | Dewan et al. | |
| 2006/0028319 A1 | 2/2006 | Kean et al. | |
| 2006/0231611 A1* | 10/2006 | Chakiris et al. | 235/380 |
| 2006/0259425 A1* | 11/2006 | Jennings et al. | 705/40 |
| 2007/0084913 A1 | 4/2007 | Weston | |
| 2007/0262134 A1* | 11/2007 | Humphrey et al. | 235/379 |
| 2007/0278292 A1 | 12/2007 | MacGuire | |
| 2008/0040274 A1* | 2/2008 | Uzo | 705/44 |
| 2008/0046747 A1 | 2/2008 | Brown et al. | |
| 2008/0086418 A1 | 4/2008 | Robbins et al. | |
| 2008/0116283 A1 | 5/2008 | Newbrough et al. | |

FOREIGN PATENT DOCUMENTS

| | | |
|---|---|---|
| JP | 2001109859 A | 4/2001 |
| WO | WO 9814900 | 4/1998 |
| WO | WO 0188659 A2 | 11/2001 |
| WO | WO 0192989 A2 | 12/2001 |

OTHER PUBLICATIONS

"TI Embraces Prox Card Standard: Texas Instruments ISO 14443 payment platform promises faster data transfer rates and more security." RFID Journal Mar. 6, 2003, http://rfidjournal.com/article/articleprint/327/-1/1.

U.S. Appl. No. 11/381,630, filed May 4, 2006.
U.S. Appl. No. 10/807,462, filed Mar. 3, 2004.
U.S. Appl. No. 11/005,864, filed Dec. 6, 2004.
U.S. Appl. No. 11/243,588, filed Oct. 4, 2005.
U.S. Appl. No. 11/671,766, filed Feb. 6, 2007.
U.S. Appl. No. 11/695,968, filed Apr. 3, 2007.

* cited by examiner

SYSTEMS AND METHODS OF PAYMENT ACCOUNT ACTIVATION

CROSS-REFERENCES TO RELATED APPLICATIONS

This application is related to "STORED VALUE CARDS AND METHODS FOR THEIR ISSUANCE," U.S. application Ser. No. 09/971,303, filed Oct. 3, 2001; "ACTIVATING TELEPHONE-BASED SERVICES USING A POS DEVICE," U.S. application Ser. No. 10/675,924, filed Sep. 29, 2003; "ELECTRONIC PAYMENT INSTRUMENT AND PACKAGING," U.S. application Ser. No. 11/539,858, filed Oct. 9, 2006; and "PRESENTATION INSTRUMENT WITH NON-FINANCIAL FUNCTIONALITY," U.S. application Ser. No. 11/551,063, filed Oct. 19, 2006, the complete disclosures of which are herein incorporated by reference.

BACKGROUND

This application relates generally to payment accounts. More specifically, this application relates to systems and methods for activating a payment account.

Gift cards, stored value payment instruments, and other prepaid payment instruments have become increasingly popular in recent years. These gifts cards or payment instruments often are linked to an underlying payment account with an account balance, although the underlying payment account may not be tied to a particular individual. Each of these payment instruments also often has a number that is encoded in a magnetic stripe and/or a bar code, with the number being associated with the underlying payment account.

The increasing popularity of these payment instruments have given rise to several problems. One problem of great concern is security. In one scenario, a thief may go to a store and secretly scan the bar code of a payment instrument that has not been activated. The thief would then simply wait for an unknowing purchaser to buy the payment instrument. Once the payment instrument has been activated following the purchase, the thief may clone the number onto another "evil twin" payment instrument, and either resell or use the "evil twin" payment instrument as if the thief was the legitimate purchaser.

Unlike traditional magnetic stripes and bar codes, radio frequency devices can provide greater security because they are better able to prevent a number that is encoded in them from being read and/or cloned. In some instances, the number that is encoded in a radio frequency device may change each time the radio frequency device is read. However, if radio frequency devices are used, it may not be possible to activate the payment account readily because many point of sale devices remain incapable of reading radio frequency devices.

Hence, there is a great need in the art for systems and methods to improve activation of a payment account.

BRIEF SUMMARY

Embodiments of the invention provide systems and methods for activating a payment account. In one set of embodiments, the payment account is associated with two identifiers. A first identifier is encoded in a magnetic stripe and/or a bar code of a payment instrument. The first identifier can be used to activate the payment account, but generally cannot be used to access funds in the payment account. A second identifier is encoded in a radio frequency device of the payment instrument. The second identifier can be used to access funds in the payment account.

Accordingly, a thief is generally unable to access funds in the payment account even if the thief has obtained the first identifier. Additionally, even if a thief has stolen the radio frequency device off of the payment instrument, the radio frequency device is useless if the payment account is not activated using the first identifier. Conversely, a purchaser of the payment instrument is able to activate the payment account at many point of sale devices with the first identifier, because traditional magnetic stripes and/or bar codes can be readily read at these point of sale devices. The purchaser can then take the payment instrument, or possibly the radio frequency device without the complete payment instrument, to a point of sale device capable of reading the radio frequency device to access funds in the payment account with the second identifier.

In another set of embodiments, a method for activating a payment account at a point of sale device includes providing a payment instrument having a first identifier and a second identifier, and the first identifier and the second identifier are associated with a unique account record in a database. The method may also include receiving from the point of sale device an activation request at a processing system to activate the payment account, the activation request including the first identifier. The method may further include determining the unique account record associated with the payment account using the first identifier, and updating the unique account record to indicate that the payment account has been activated. Additionally, the method may include transmitting from the processing system an activation response that the payment account has been activated. The unique account record may be determinable using the second identifier. Additionally, the first identifier may be accessible through a reader selected from the group consisting of a magnetic stripe reader and a bar code reader. Moreover, the second identifier may be accessible through a radio frequency identification reader.

The methods of the invention may be embodied in a system including a database, a payment instrument, a magnetic stripe reader and/or a bar code reader, a radio frequency identification reader, and processing system. The processing system may include a processor, memory, and a set of instructions executable by the processor for operating the processing system in accordance with the embodiments described above. The methods of the invention may also be embodied in a computer-readable storage medium having a computer-readable program embodied therein for directing operations of the processing system in accordance with the embodiments described above.

BRIEF DESCRIPTION OF THE DRAWINGS

A further understanding of the nature and advantages of particular embodiments may be realized by reference to the following drawings. In the appended figures, similar components or features may have the same reference label. Further, various components of the same type may be distinguished by a dash and a second label as a second reference label following the reference label. If only the first reference label is used in the specification, the description is applicable to any one of the similar components having the same first reference label irrespective of the second reference label.

DETAILED DESCRIPTION

Figure 1:
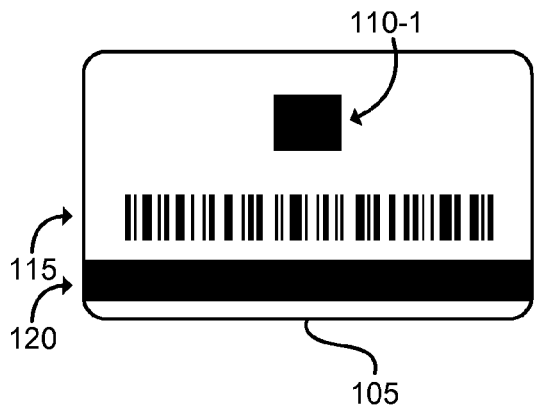
FIG. 1 illustrates an exemplary payment instrument according to various embodiments of the invention.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

In an aspect, certain embodiments of the invention provide systems and techniques for activating a payment account. The payment account may be associated with, without limitation, a gift card, a stored value payment instrument, and/or a prepaid payment instrument. For example, a payment account associated with a stored value payment instrument may be termed a stored value account. As used herein, the term "payment instrument" is intended to be construed broadly as comprising any device or means that can be used to make a payment. In some aspects, in order to make a payment with the payment instrument, the payment instrument may need to be activated and/or funds may need to be added to the payment instrument first.

Beneficially, the payment instrument has two identifiers; the two identifiers are both associated with the payment account. Merely by way of example, a payment instrument may have a bar code and a radio frequency device. A first identifier is encoded in the bar code, and a second identifier is encoded in the radio frequency device. Initially, the payment account, such as one having a gift card balance, is inactive. A purchaser of the payment instrument may first activate the payment account by buying the payment instrument at one of many point of sale ("POS") devices that is capable of reading the first identifier from the bar code. After the purchase and following activation of the payment account using the first identifier, the payment account may have a gift card balance of $50.

The purchaser may then decouple the radio frequency device from the payment instrument, and attach the radio frequency device to another device, such as a cell phone, that the purchaser carries regularly. The second identifier that is encoded in the radio frequency device can be used to access funds in the payment account. Hence, the purchaser may subsequently use the $50 gift card balance by taking the cell phone, with the radio frequency device conveniently attached, to a POS device that is capable of reading the second identifier from the radio frequency device. It is noted that the first identifier generally cannot be used to access funds in the payment account, whereas radio frequency devices are better able to prevent a number that is encoded in them from being read and/or cloned. Hence, the possibility of a thief creating an "evil twin" payment instrument is greatly reduced in this example.

FIG. 1 illustrates an exemplary payment instrument 105 according to various embodiments of the invention. The payment instrument 105 may be displayed and packaged in various other ways. Additional details are also provided in U.S. application Ser. No. 10/665,984, filed Sep. 19, 2003 and entitled "FINANCIAL PRESENTATION INSTRUMENTS WITH INTEGRATED HOLDER AND METHODS FOR USE," the entire disclosure of which is incorporated herein by reference for all purposes.

The payment instrument 105 is shown in a same shape and size as a regular credit card specified by the ISO 7810 standard. However, the payment instrument 105 may be in many other shapes or forms, so long as the payment instrument 105 can sufficiently serve as a carrier for a radio frequency device 110, as well as being able to have at least one of a bar code 115 or a magnetic stripe 120. As shown, the payment instrument 105 has a radio frequency device 110-1 and both a bar code 115 and a magnetic stripe 120. A first identifier is encoded in the bar code 115. Likewise, the first identifier is also encoded in the magnetic stripe 120. A second identifier is encoded in the radio frequency device 110 so the radio frequency device 110 comprises the second identifier. Accordingly, the payment instrument has both the first identifier and the second identifier. Each identifier may include an indication whether it is a first identifier or a second identifier.

The radio frequency device 110-1 is removably coupled with the payment instrument 105. For example, adhesive may be applied to one side of the radio frequency device 110-1, and the side with the adhesive may be temporarily attached to the payment instrument 105 on a waxy surface. It will be appreciated that the particular type of attachment may be chemical and/or mechanical. For example, suitable attachments may include, without limitation, adhesives, pins, magnets, or threaded fasteners. Further, attachments may be generalized for a variety of carriers or customized to particular carriers; they may be permanent or temporary; and they may be fixed or removable.

Figure 2:
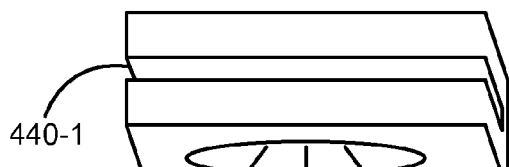
FIG. 2 illustrates an exemplary radio frequency device according to various embodiments of the invention.
Figure 2:
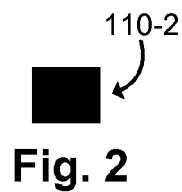
Figure 3:
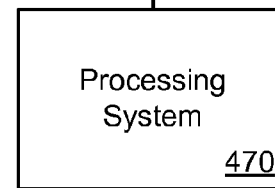
FIG. 3 illustrates an exemplary device with a radio frequency device attached according to various embodiments of the invention.

In FIG. 2, the radio frequency device 110-2 shows the radio frequency device 110-1 after having been decoupled from the payment instrument 105 according to various embodiments of the invention. The radio frequency device 110-2 is then attachable to a surface other than of the payment instrument 105. In FIG. 3, the radio frequency device 110-3 is shown as attached to a cell phone 330 according to various embodiments of the invention.

Figure 4:
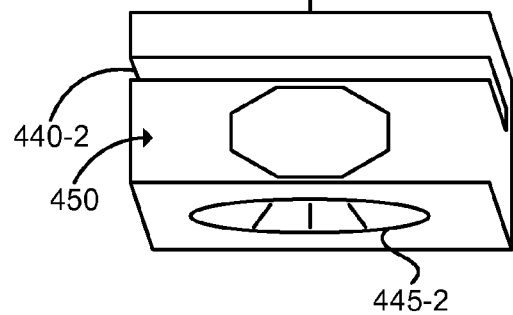
FIG. 4 illustrates a system for activating a payment account according to various embodiments of the invention.
Figure 5:
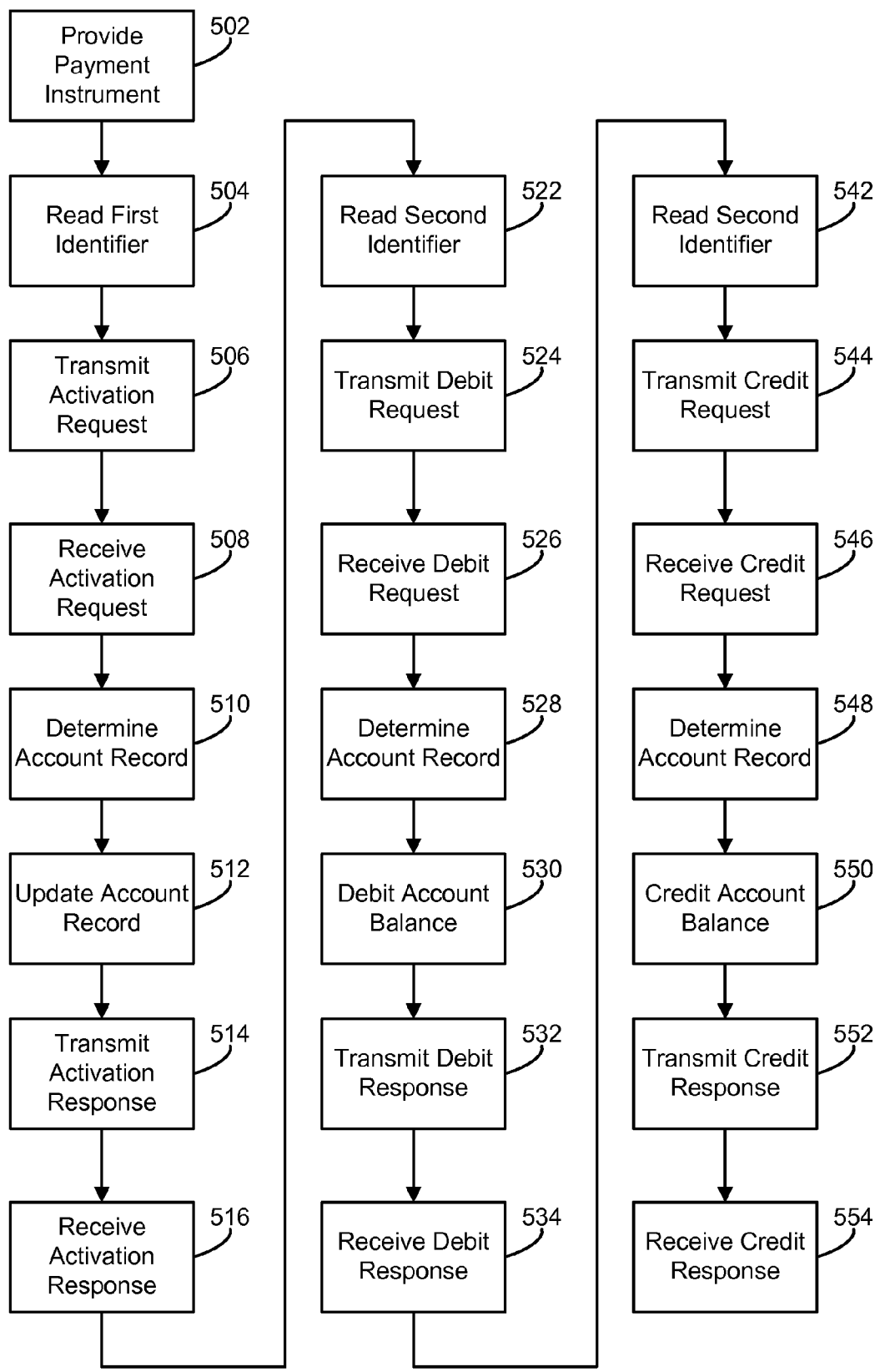
FIG. 5 is a flow diagram that illustrates a method for activating a payment account according to various embodiments of the invention.

FIG. 4 illustrates an example of a system within which various embodiments of the invention may be included. The system may include a magnetic stripe reader 440, a bar code reader 445, a radio frequency identification reader 450, a processing system 470, and a database system 475.

The magnetic stripe reader 440 is capable of reading the first identifier encoded in the magnetic stripe 120, for example, by sliding the payment instrument 105 through a lot. The magnetic stripe reader 440-1 is shown as being integrated with the bar code reader 445-1. The bar code reader 445-1 is capable of reading the first identifier encoded in the bar code 115. For example, when the bar code 115 is placed in front of the bar code reader 445-1 having a light source, an encoded number can be read because dark bars in the bar code 115 absorb light and white spaces in the bar code 115 reflect light. Although both readers are shown, a first POS device may comprise one of the two readers but not both.

The radio frequency identification reader 450 is capable of reading the second identifier encoded in the radio frequency device 110. For example, when the radio frequency device 110 is placed within a certain distance from the radio frequency identification reader 450, an encoded number can be read wirelessly through an antenna that is embedded in an area of the radio frequency identification reader 450. A second POS device comprises the radio frequency identification reader 450. The second POS device may also comprise either or both of the magnetic stripe reader 440-2 and the bar code reader 445-2. As shown, the second POS device happens to comprise all three readers.

The processing system 470 is in communication with both the first POS device and the second POS device. Because the POS devices comprise readers that can access the first identifier and the second identifier, the two identifiers that are associated with a payment account can be processed at the processing system 470. The processing system 470 may be a server or a computational machine with a processor, memory, storage device, and input/output devices. The processing system 470 may also have one or more communication interfaces for communication or networking with POS devices and/or other servers or computational machines. The communication or networking may be through a proprietary payment network, another proprietary network, and/or the Internet, and may or may not be encrypted. The processing system 470 further cooperates or is in communication with one or more database systems. The database system 475 is shown.

The database system 475 may include one or more databases. For example, the database system 475 may have a database of account records that has a unique account record associate with the payment account. The database system 475 may also have a first mapping database that has a first mapping from the first identifier to the unique account record. The database system 475 may likewise have a second mapping database that has a second mapping from the second identifier also to the unique account record.

The first mapping database and the second mapping database may be completely distinct and unrelated in one embodiment, and may even reside on different database systems in another embodiment. Alternatively, the database of account records, the first mapping database, and the second mapping database may all be in a same database in yet another embodiment. As another alternative, the first mapping database and the second mapping database may be in a same database different from the database of account records in an embodiment. If security is less of a concern, the first identifier may even have a same value as the second identifier in certain embodiments (and the first identifier may in fact be used to access funds in the payment account). However, the first identifier also may not be associated in any way with the second identifier in another embodiment.

Referring now to FIG. 2, one exemplary method for activating a payment account according to various embodiments of the invention will be described. In step 502, an issuer of a payment instrument may provide the payment instrument for sale. For example, a payment instrument may be provided to a retail store to carry the payment instrument as regular merchandise. The payment instrument may be inactive initially, but has a first identifier and a second identifier. The two identifiers are associated with a unique account record in a database. The unique account record is associated with a payment account.

If a purchaser desires to buy the payment instrument, the purchaser may take the payment instrument to a first POS device to pay for the payment instrument and to activate the payment account. In step 504, the first POS device reads the first identifier from the payment instrument either through a magnetic stripe reader or a bar code reader. The first POS device may then transmit an activation request to activate the payment account to a processing system in step 506. The activation request includes the first identifier. The activation request may also include an indication that the identifier is a first, rather than a second, identifier in one embodiment. In another embodiment, the identifier itself may indicate that it is a first identifier.

The processing system receives the activation request from the first POS device in step 508, and may proceed to determine a unique account record that is associated with the payment account by using the first identifier in step 510. In some embodiments, the processing system may search for a first mapping from the first identifier to the unique account record in a first mapping database. In step 512, the processing system then updates the unique account record to indicate that the payment account has been activated, such as by setting a particular filed in the unique account record. The unique account record may have an initial account balance such as $50. In other embodiments, the unique account record may not have an initial account balance, and funds may need to be added.

Subsequently, the processing system may transmit an activation response to the first POS device that the payment account has been activated in step 514. The first POS device may in turn receive the activation response in step 516 and complete the initial purchase of the payment instrument. Because the radio frequency device may be removably coupled with the payment instrument, the purchaser may then decouple the radio frequency device from the payment instrument and attach the radio frequency device to another device, such as a cell phone, that the purchaser carries regularly.

The purchaser may take the cell phone to a second POS device to use the account balance in the payment account. The second POS device may read the second identifier from the radio frequency device through a radio frequency identification reader in step 522. In step 524, the second POS device may transmit a debit request to the processing system. The debit request may include the second identifier and an amount that the purchase wishes to debit from the payment account. The debit request may also include an indication that the identifier is a second, rather than a first, identifier in one embodiment. In another embodiment, the identifier itself may indicate that it is a second identifier.

The processing system may then receive the debit request to debit the payment account in step 526, and may proceed to determine the unique account record that is associated with the payment account by using the second identifier in step 528. In some embodiments, the processing system may search for a second mapping from the second identifier to the unique account record in a second mapping database. In step 530, the processing system may then debit the unique account record in accordance with the debit request. For example, if an account balance in the unique account record is $50 and the purchaser wishes to debit $20 from the payment account, the account balance in the unique account record would become $30.

Subsequently, the processing system may transmit a debit response to the second POS device that the payment account has been debited in step 532. The second POS device may in turn receive the debit response in step 534 and the purchaser is allowed to receive service, merchandise, and/or a receipt for having made the payment. It is noted that the purchaser is described above as using the account balance in the payment account at the second POS device rather than at the first POS device. This is because the first POS device may not be capable of reading the second identifier. However, in some embodiments, the first POS device may be a same device as the second POS device. In other embodiments, the first POS device may also be capable of reading the second identifier. It will be understood that if the first POS device is capable of reading the second identifier, the purchaser would be able to use the account balance in the payment account following purchase at the first POS device.

As noted above, funds may need to be added first because the unique account record may not have an initial account balance in certain embodiments. Likewise, in some embodiments, the purchaser may wish to a replenish funds in the payment account. Funds may be added to the payment account by first accepting a payment amount from the purchaser and reading the second identifier from the radio frequency device in step 542. It is noted that that there is less of a security concern in allowing funds to be added by using the first identifier. Even though the first identifier may be obtained by a thief, the thief would be welcomed to add funds using the first identifier. Hence, in some embodiment, funds may also be added by using the first identifier at a POS device that is incapable of reading the second identifier. Nevertheless, the following description assumes that the second identifier has been read.

In step 544, a credit request may be transmitted to the processing system, and the credit request may be received by the processing system in step 546. The credit request may include the second identifier and an amount that the purchaser wishes to credit to the payment account. The credit request may also include an indication that the identifier is a second, rather than a first, identifier in one embodiment. In another embodiment, the identifier itself may indicate that it is a second identifier. In step 548, the processing system may proceed to determine the unique account that is associated with the payment account by using the second identifier. In step 550, the processing system may then credit the unique account record in accordance with the credit request. For example, if the account balance in the unique account record is $30 and the purchaser wishes to credit $40 to the payment account, the account balance in the unique account record would become $70. In step 552, the processing system may transmit a credit response that the payment account has been credited. In step 554, the credit response may be received at a location of the purchaser that funds have been credited to the payment account.

It should be noted that the methods, systems and devices discussed above are intended merely to be exemplary in nature. For example, rather than taking the payment instrument to a first POS device to pay for the payment instrument and to activate the payment account, the purchaser may use a telephone. The purchaser may have obtained the payment instrument, without limitation, in the mail, from a retail outlet, from a distribution point, or the like. The first identifier may be readable by the purchaser, allowing the purchaser to enter the first identifier over the telephone to activate the payment account. For example, the first identifier may be printed as human readable letters and/or numbers on the payment instrument and/or the radio frequency device. In some instances, the purchaser may have a reader for reading the first identifier. The purchaser may also pay for the payment account and/or add funds to the payment account over the telephone. The telephone may be connected to an Interactive Voice Response ("IVR") system and/or a telephone response unit ("TRU") that is linked and/or associated with the processing system. Accordingly, the processing system can receive an activation request and/or transmit an activation response similar to the system based on POS devices. The activation may also be performed securely. Likewise, it will be understood by those skilled in the art that the processing system can receive a debit request, receive a credit request, transmit a debit response, and/or transmit a credit response through the IVR system and/or the TRU.

It must also be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method for activating a payment account at a point of sale device, the method comprising:
   providing a payment instrument having a first identifier, a second identifier, at least one storage device, and a radio frequency device, wherein:
      the first identifier and the second identifier are associated with an unique account record in a database;
      the first identifier is physically stored on the at least one storage device selected from a group consisting of:
         a magnetic strip,
         a bar code, and
         both the magnetic stripe and the barcode;
      the second identifier is physically stored on the radio frequency device;
      the first identifier is not associated with the second identifier; and
      the first identifier cannot be used to access funds in the payment account;
   receiving from the point of sale device an activation request at a processing system to activate the payment account, the activation request comprising the first identifier that was read from the at least one storage device by the point of sale device;
   determining the unique account record associated with the payment account using the first identifier;
   updating the unique account record to indicate that the payment account has been activated; and
   transmitting from the processing system an activation response that the payment account has been activated;
   wherein the unique account record is also determinable using the second identifier;

receiving from another point of sale device a request to debit an amount from the payment account, the request comprising the second identifier that was read from the radio frequency device using the other point of sale device;

wherein the first identifier is accessible through a reader selected from the group consisting of a magnetic stripe reader and a bar code reader; and wherein the second identifier is accessible through a radio frequency identification reader.

2. The method of claim 1, further comprising:

reading the first identifier at the point of sale device, the point of sale device comprising the reader selected from the group consisting of a magnetic stripe reader and a bar code reader;

transmitting the activation request to activate the payment account from the point of sale device to the processing system; and receiving at the point of sale device the activation response that the payment account has been activated.

3. The method of claim 1, wherein the point of sale device is a first point of sale device, the method further comprising:

reading the second identifier at a second point of sale device, the second point of sale device comprising the radio frequency identification reader;

transmitting a debit request to debit the payment account from the second point of sale of device to the processing system; and receiving at the second point of sale device a debit response that the payment account has been debited;

wherein the first point of sale device is incapable of reading the second identifier.

4. The method of claim 1, wherein the point of sale device is a first point of sale device, the method further comprising:

receiving from a second point of sale device a debit request to debit the payment account, the debit request comprising the second identifier;

determining the unique account record associated with the payment account using the second identifier;

debiting an account balance in the unique account record in accordance with the debit request; and transmitting from the processing system a debit response that the payment account has been debited.

5. The method of claim 4, wherein the first point of sale device is a same point of sale device as the second point of sale device.

6. The method of claim 1, wherein determining the unique account record using the first identifier comprises searching for a mapping from the first identifier to the unique account record in a mapping database.

7. The method of claim 6, wherein:

the mapping database is a first mapping database;

the mapping from the first identifier to the unique account record is a first mapping; and the unique account record is also determinable using the second identifier by searching for a second mapping from the second identifier to the unique account record in a second mapping database.

8. The method of claim 7, wherein the first mapping database is a same database as the second mapping database.

9. The method of claim 1, wherein the payment account is associated with a stored value account.

10. A system for activating a payment account at a point of sale device, the system comprising:

a database having a unique account record associated with the payment account;

a payment instrument having a first identifier, a second identifier, a storage device, and a radio frequency device, wherein:

the first identifier and the second identifier are associated with the unique account record, the first identifier is physically stored on the storage device selected from a group consisting of:

a magnetic stripe, a bar code, and both the magnetic stripe and the barcode;

the second identifier is stored on the radio frequency device;

the first identifier is not associated with the second identifier; and the first identifier cannot be used to access funds in the payment account;

a reader selected from the group consisting of a magnetic stripe reader and a bar code reader, wherein the first identifier is accessible through the reader;

a radio frequency identification reader, wherein the second identifier is accessible through the radio frequency identification reader; and a processing system configured to:

receive from the point of sale device an activation request to activate the payment account, the activation request comprising the first identifier that was read from the payment instrument using the reader;

determine the unique account record using the first identifier;

update the unique account record to indicate that the payment account has been activated; and transmit an activation response that the payment account has been activated;

wherein the processing system is also configured to receive from the radio frequency identification reader the second identifier that was read from the radio frequency device and to determine the unique account record using the second identifier to permit the unique account to be debited by a payment amount.

11. The system of claim 10 wherein the radio frequency device is removably coupled with the payment instrument.

12. The system of claim 11, wherein the radio frequency device is attachable to a surface other than of the payment instrument after the radio frequency device is decoupled with the payment instrument.

13. The system of claim 11, wherein the payment instrument comprises a bar code and a magnetic strip, wherein the bar code comprises the first identifier and the magnetic stripe also comprises the first identifier.

14. The system of claim 10, further comprising:

a first point of sale device comprising the reader selected from the group consisting of a magnetic stripe reader and a bar code reader; and a second point of sale device comprising the radio frequency identification reader.

15. A method for providing a payment account, the method comprising:

providing a payment instrument having a first identifier and a second identifier, wherein:

the first identifier and the second identifier are associated with a unique account record in a database;

the first identifier is not associated with the second identifier; and the first identifier cannot be used to access funds in the payment account;

reading the first identifier at a first point of sale device, the first point of sale device comprising a reader selected from the group consisting of a magnetic stripe reader and a bar code reader;

transmitting an activation request to activate the payment account from the first point of sale device to a processing system;

receiving from the first point of sale device the activation request at the processing system to activate the payment account, the activation request comprising the first identifier;

determining the unique account record associated with the payment account using the first identifier;

updating the unique account record to indicate that the payment account has been activated;

transmitting from the processing system an activation response that the payment account has been activated;

receiving at the first point of sale device the activation response that the payment account has been activated;

reading the second identifier at a second point of sale device, the second point of sale device comprising a radio frequency identification reader;

transmitting a debit request to debit the payment account from the second point of sale of device to the processing system;

receiving from the second point of sale device the debit request to debit the payment account, the debit request comprising the second identifier;

determining the unique account record associated with the payment account using the second identifier;

debiting an account balance in the unique account record in accordance with the debit request;

transmitting from the processing system a debit response that the payment account has been debited; and receiving at the second point of sale device the debit response that the payment account has been debited;

wherein the first point of sale device is incapable of reading the second identifier.

16. The method of claim 15, further comprising:

receiving a credit request to credit the payment account, the credit request comprising the second identifier;

determining the unique account record associated with the payment account using the second identifier;

crediting the account balance in the unique account record in accordance with the credit request; and transmitting from the processing system a credit response that the payment account has been credited.

17. A method for activating and using a payment account, the method comprising:

providing a payment instrument having a first identifier, a second identifier, a storage device, and a radio frequency device, wherein:

the first identifier and the second identifier are both associated with a unique account record in a database, the first identifier is physically stored on the storage device, the storage device is selected from a group consisting of: a bar code, and a magnetic stripe;

the second identifier is physically stored on the radio frequency device;

the first identifier is not associated with the second identifier; and the first identifier cannot be used to access funds in the payment account;

receiving at a processing system from a first point of sale device an activation request to activate the payment account, the activation request comprising the first identifier that was read from the storage device by the first point of sale device;

determining by the processing system the unique account record associated with the payment account using the first identifier;

updating the unique account record to indicate that the payment account has been activated; and transmitting from the processing system to the first point of sale device an activation response that the payment account has been activated;

receiving from a second point of sale device a request to debit an amount from the payment account, the request comprising the second identifier that was read from the radio frequency device using the second point of sale device;

identifying by the processing system the unique account using the second identifier;

debiting the payment account by the debit amount; and transmitting a confirmation of the debit amount to the second point of sale device.

* * * * *